United States Patent [19]

Gumberich et al.

[11] 4,328,874

[45] May 11, 1982

[54] DIGITAL WEIGHING SCALE WITH SELECTABLE COMPUTATIONAL PARAMETERS

[75] Inventors: Clinton L. Gumberich, Randolph; Armando J. Visioli, Jr., Dover; Richard H. Kunz, Budd Lake, all of N.J.

[73] Assignee: Ohaus Scale Corporation, Florham Park, N.J.

[21] Appl. No.: 126,890

[22] Filed: Mar. 3, 1980

[51] Int. Cl.³ .............................................. G01G 23/01
[52] U.S. Cl. ................................. 177/25; 177/DIG. 3; 364/567
[58] Field of Search .................. 364/567, 466; 177/25, 177/1, DIG. 3

[56] References Cited

U.S. PATENT DOCUMENTS

| | | | |
|---|---|---|---|
| 3,737,863 | 6/1973 | Rowland | |
| 3,770,069 | 11/1973 | Loshbough | 177/25 X |
| 3,860,802 | 1/1975 | Knothe | 177/25 X |
| 3,921,736 | 11/1975 | Rogers | 177/1 |
| 3,959,636 | 5/1976 | Johnson | 177/25 X |
| 4,029,161 | 6/1977 | Foster | 177/25 |
| 4,063,604 | 12/1977 | Rock | 177/25 |
| 4,075,688 | 2/1978 | Lynch | 364/200 |
| 4,107,784 | 8/1978 | Van Bemmelen | 364/900 |
| 4,133,039 | 1/1979 | Eichenlaub | 364/900 X |
| 4,193,116 | 3/1980 | Funk | 364/567 X |
| 4,236,222 | 11/1980 | Loshbough | 364/567 |

*Primary Examiner*—Joseph W. Hartary
*Attorney, Agent, or Firm*—Robert R. Jackson; John A. Howson

[57] ABSTRACT

One or more computational parameters in a digital weighing scale can be varied by the user of the scale. The normal digital display of the scale is used to successively display a plurality of messages indicating the parameters or parameter values selectable by the user, and the user selects the desired parameter or parameter value by operating one of the normal scale controls during display of the message indicating the desired parameter or the desired parameter value.

6 Claims, 2 Drawing Figures

DIGITAL WEIGHING SCALE WITH SELECTABLE COMPUTATIONAL PARAMETERS

BACKGROUND OF THE INVENTION

This invention relates to weighing scales, and more particularly to weighing scales including digital data processing apparatus for computing and displaying a quantity representative of or proportional to the weight on the scale in accordance with a computational algorithm which is at least partly determined by variable parameters selected by the user of the scale.

Weighing scales in which the weight information is converted to digital signals which are processed digitally to produce a visual digital display are known. The digital data processing circuits employed in these scales typically make use of various digital parameters to at least partly control the computational algorithm of the scale. The functions performed by the scale can be varied by varying these parameters.

In many applications, it is desirable to allow the user of the scale to vary the function of the scale by selecting the appropriate values for these parameters. One way to accomplish this is to provide one or more selection switches on the scale to allow the user to select the desired parameter values. This adds to the number of controls which must be provided on the scale and may mean that basically the same scale must be provided in several different versions or models with different selection switches to meet the requirements of various users.

For example, some users of the scale may work with different measurement systems (e.g., ounces, grams, pennyweight, carats, grains, etc.) and may want to be able to select the weight units in which the scale computes and displays the weight of an object. Other users may wish to have the scale display monetary value rather than weight, with the ability to select an appropriate value per unit weight for use by the scale in converting weight to value. Still other users may work under conditions which may sometimes disturb the scale or with objects such as animals whose movements may sometimes disturb the scale. These users may wish to vary the sensitivity of the scale to such disturbances to adapt the scale to these various conditions.

If selection switches are provided on the scale for all of these various user needs, the construction and operation of the scale will be greatly complicated. On the other hand, if only those selection switches of interest to particular users are provided on each scale, a considerable number of different scale constructions may be required to satisfy the needs of all possible scale users.

It is therefore an object of this invention to improve and simplify weighing scales of the digital computational and display type.

It is a more particular object of this invention to provide an improved weighing scale of the digital computational and display type in which the computational parameters of the scale can be varied by the user without the use of any elaborate additional selection controls on the scale.

SUMMARY OF THE INVENTION

These and other objects of the invention are accomplished in accordance with the principles of the invention by providing a weighing scale in which messages indicating the parametric options available to the user are automatically displayed one after another on the normal digital display of the scale and the user selects the desired option by operating a simple control on the scale (preferably one of the normal scale controls) during display of the message indicating the desired option. In the preferred embodiments, no additional external controls, indicia, or displays are required on the scale. The scale can therefore be adapted to the needs of many different users by internal changes only, i.e., by modifying the circuitry to display options appropriate to the needs of any particular user and to make appropriate use of the options selected.

Further features of the invention, its nature and various advantages will be more apparent from the accompanying drawing and the following detailed description of the invention.

DETAILED DESCRIPTION OF THE INVENTION

Although the invention is applicable to allowing the user of a scale to select any of several variable parameter values used in the computational circuits of the scale, a particularly important example is selection of the number of weight determinations to be averaged in computing the weight to be displayed. Accordingly, the invention will be first described in this context, which is sometimes referred to herein as the selectable averaging application of the invention. Later, an alternative embodiment of the invention in which another computational parameter is selectable by the user will be described. From these illustrative embodiments, those skilled in the art will understand how the invention can be readily implemented in many other applications within the scope of the invention.

Referring now to the selectable averaging embodiment, when a scale is to be used under conditions which may disturb the scale (e.g., vibration or other motion of the scale or the object to be weighed, irregular ambient air currents, etc.), it is desirable for the user of the scale to be able to obtain a weight reading which is the average of several successive weight determinations by the scale. It is also desirable for the user to be able to vary the number of weight determinations to be averaged for this purpose because the scale may sometimes be relatively undisturbed and weight readings can be made faster when fewer weight determinations must be averaged to produce a reading, while at other times the scale may be subject to greater disturbance and more weight determinations should be averaged to obtain accurate readings.

Figure 1:
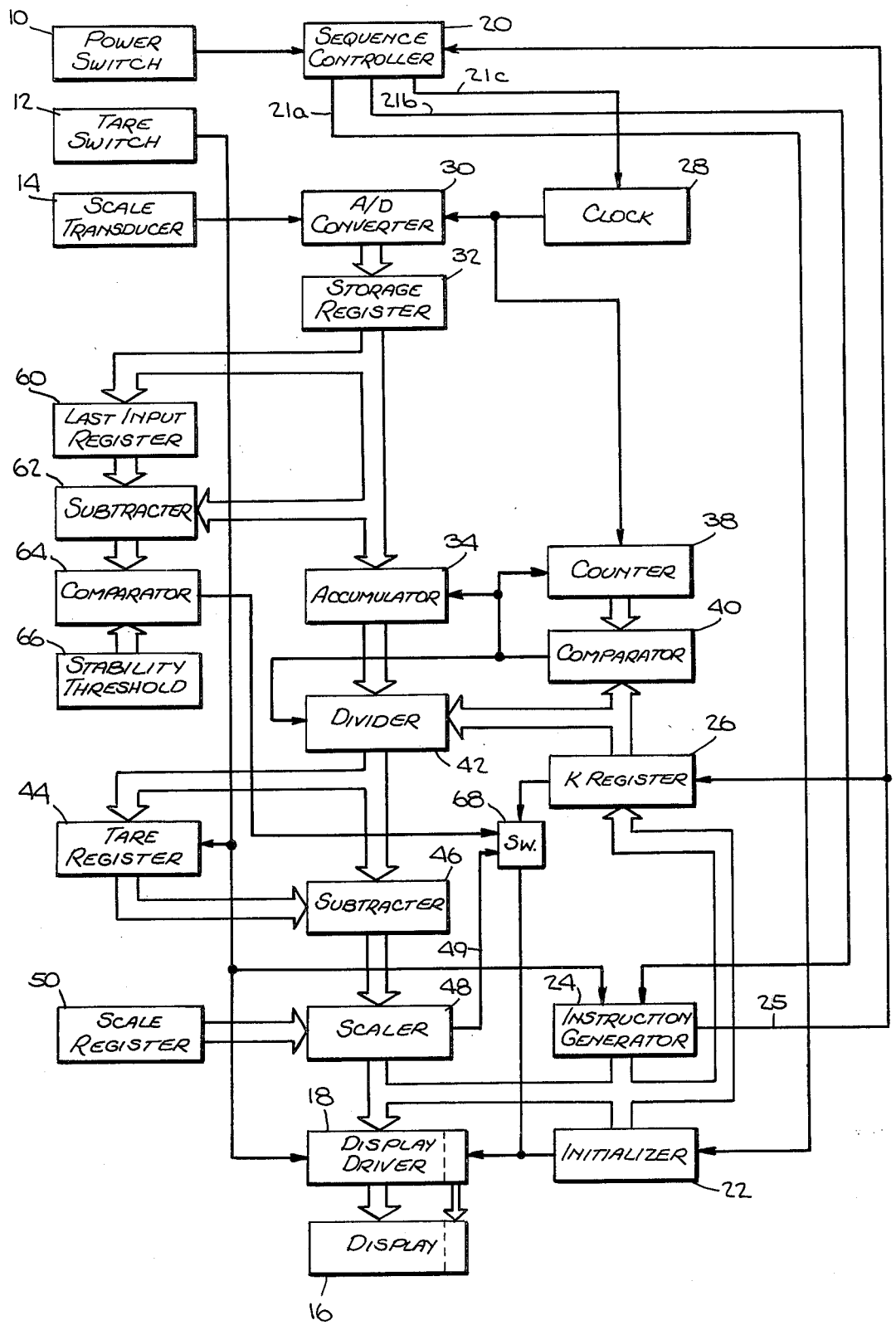
FIG. 1 is a schematic block diagram of an illustrative embodiment of the digital circuitry of a weighing scale constructed in accordance with the principles of the invention.

A scale in which the number of weight determinations averaged to produce a weight reading is variable in accordance with the principles of this invention is shown in FIG. 1. This scale has three inputs: power switch 10 for turning the scale on and off; tare switch 12 which normally causes a tare weight to be stored in a tare register as described below; and scale transducer 14 which produces an analog output signal proportional to the weight on the scale. The scale has one output: visual digital display 16, e.g., a conventional light emitting diode display preferably including a plurality of seven-segment elements each capable of representing a decimal digit and at least some letters of the alphabet. At least some of the seven-segment elements may also include a decimal point segment if fractional weight units are to be displayed. In the preferred embodiment shown in FIG. 1, the left-hand portion of display 16 normally displays the weight of an object placed on the scale, and the right-hand portion of the display displays a letter (e.g., "g" for grams) indicative of the weight units in which the weight is shown. As described in detail below, this units indicating portion of display 16 is only illuminated at selected times to indicate that the displayed weight can be read and relied on (i.e., that a stability criterion has been satisfied or that an average weight has been computed as described in detail below). The two portions of display 16 are driven by the corresponding portions of conventional display driver 18.

When power switch 10 is turned on, sequence controller 20 automatically returns to an initial condition in which an enabling signal is applied via lead 21a to initializer 22. While thus enabled, initializer 22 produces output signals for causing display driver 18 to illuminate display 16 in a predetermined test pattern. Sequence controller 20 enables initializer 22 in this way for a time interval sufficient for the user of the scale to confirm that display 16 is operating properly. Sequence controller 20 then automatically steps to its second condition in which initializer 22 is disabled and an enabling signal is applied to instruction generator 24 via lead 21b.

When instruction generator 24 is thus enabled, it produces a succession of output signals applied to display driver 18 for causing display 16 to successively display a plurality of predetermined numbers, any one of which can be selected by the user of the scale as the number of successive weight determinations which are to be averaged in subsequent weight computations. The successive displays produced by instruction generator 24 also preferably include some distinctive information to prompt the user to make a selection. For example, instruction generator 24 may cause display 16 to successively display the messages "SEL 16", "SEL 8", and "SEL 4" to indicate that the user may select the number 16, 8, or 4, respectively. Instruction generator 24 causes each of these messages to be displayed for a time interval sufficient for the user to read the message and respond during the display of the desired number.

When the message including the desired number appears on display 16, the user selects that number by momentarily operating tare switch 12. Although tare switch 12 is used to indicate a selection in the preferred embodiment shown in FIG. 1, any other simple on-off type control can be used if desired. The output signal of tare switch 12 extinguishes display 16 via display driver 18, and also stops the advance of instruction generator 24. When thus stopped, instruction generator 24 produces an output signal on lead 25 for enabling K register 26 to store the number which was being displayed when the tare switch was operated. The signal on lead 25 is also applied to sequence controller 20 to cause it to advance from its second condition to its third condition. In this condition, sequence controller 20 disables instruction generator 24 and enables clock 28 via lead 21c. The scale is now ready to perform weight computations in which the selected number (e.g., 16, 8, or 4, as stored in K register 26) of successive weight determinations are averaged to produce the weight value to be displayed.

If the user does not respond to any of the messages produced by instruction generator 24, the instruction generator automatically produces an output signal on lead 25 at the end of its operating cycle which causes a predetermined value to be stored in K register 26 "by default" and allows sequence controller 20 to advance to its third condition as described above. The default value may be one of the options displayed or it may be any other number. In the preferred embodiment the default value is 2. Thus if the user fails to make a selection, the number 2 is automatically selected.

When clock 28 is enabled as described above, the weight computation circuitry of the scale is enabled. In response to each timing signal pulse produced by clock 28, analog-to-digital (A/D) converter 30 converts the output signal of transducer 14 to a digital output signal which is temporarily stored in storage register 32. Each such digital output signal is sometimes referred to herein as a weight determination. Accumulator 34 adds each successive weight determination to the sum of the preceding weight determinations until it is cleared by the output signal of comparator 40. Similarly, counter 38 counts the timing signal pulses produced by clock 28 until it is reset by the output signal of comparator 40.

Comparator 40 compares the contents of counter 38 and K register 26 and produces an output signal for enabling divider 42 when counter 38 has counted a number of timing signal pulses equal to the contents of K register 26. When this occurs, accumulator 34 will have accumulated a number of successive weight determinations equal to the number stored in the K register. In response to the output signal of comparator 40, divider 42 divides the contents of accumulator 34 by the number stored in K register 26 to produce an average of the previously accumulated weight determinations. Also in response to the output signal of comparator 40, accumulator 34 and counter 38 are cleared or reset to allow the accumulation of successive weight determinations to begin again.

The average weight determination produced by divider 42 is stored in tare register 44 if tare switch 12 is operated. Operation of the tare switch also prevents operation of display driver 18 in response to the average weight determination which is being stored in tare register 44. After tare register 44 has been loaded, the contents of tare register 44 are subtracted from each subsequent average weight determination produced by divider 42 by means of subtracter 46. Each net weight determination thus produced by subtracter 46 is applied to scaler 48 where it is multiplied (or divided) by an appropriate predetermined scale factor stored in scale register 50. This scale factor is a quantity appropriate to convert the net weight determination to an actual weight value (or other desired weight-dependent quantity) in the appropriate units for display by the scale. The weight value produced by scaler 48 is applied to display driver 18 which causes display 16 to display the applied weight value.

The scale circuit shown in FIG. 1 also includes a stability detecting circuit including elements 60, 62, 64, and 66 which compares successive weight determinations to determine whether or not the scale is relatively stable. Each successive weight determination stored in storage register 32 is subtracted from the preceding weight determination stored in last input register 60 by means of subtracter 62. The difference determined by subtracter 62 is compared by comparator 64 to a stability criterion or threshold value stored in register 66. If the difference determined by subtracter 62 exceeds the stability threshold, the scale has not yet reached a stable condition and no stability is indicated by comparator 64. If, however, the difference determined by subtracter 62 is less than the stability threshold, the scale is considered stable and comparator 64 produces a stability indicating output signal.

The output signal of comparator 64 is applied to one input terminal of switch 68. The condition of switch 68 is determined by the contents of K register 26. If the number stored in K register 26 is 2, switch 68 is conditioned to apply the output signal of comparator 64 to the right-hand portion of display driver 18 to cause the units indicating portion of display 16 to be illuminated whenever the stability criterion is satisfied. In this way, the user knows when the weight displayed by the scale is considered to be a stable weight reading. This same signal can be used to cause a recording mechanism (not shown, but typically a conventional printer) connected to the scale to record the weight measured by the scale when stability is detected.

In accordance with the principles of this invention, this stability indicating function is automatically suspended when the weight computation is based on an average of successive weight determinations greater in number than the number of successive weight determinations compared by the stability apparatus, i.e., when the number in K register 26 is more than 2. In that event, switch 68 is conditioned to disconnect comparator 64 from display driver 18. Instead, switch 68 applies an output signal of scaler 48 on lead 49 to the right-hand portion of display driver 18 to cause momentary illumination of the units indicating portion of display 16 each time scaler 48 computes a new weight value to be displayed. In this way, when the weight values are based on averages of relatively large numbers of successive weight determinations, the user is alerted each time a new weight value has been computed and is being displayed.

If at any time the user wants to change the number in K register 26, the scale is simply turned off momentarily. When the scale is turned on again, sequence controller 20 automatically resets to its initial condition in which initializer 22 is enabled. Thereafter, sequence controller 20 advances to its second condition in which instruction generator 24 again displays the sequence of messages described above, thereby giving the user the opportunity to select a new value for storage in K register 26. Alternatively, the apparatus could be arranged so that sequence controller 20 would step back from its third condition to its second condition to enable instruction generator 24 if the tare switch were operated for a predetermined time interval longer than the normal tare switch operating time interval. This would allow the user to change the contents of K register 26 without turning the scale off and on again.

As will be apparent from the foregoing, this invention allows selection of a computational parameter for use in the computational algorithm of the scale without the need for any elaborate additional selection switches, indicia, or displays on the scale. The alternative values of the computational parameter are displayed sequentially on the normal scale display and the user selects the desired value by operating a simple switch which is preferably one of the normal scale controls during display of the desired value.

The principles of the invention are equally applicable to varying other computational parameters of the scale. In the embodiment shown in FIG. 2, for example, both the number of successive weight determinations to be averaged and the scale factor applied to the averaged weight are variable or selectable in accordance with the invention. Most of the scale circuit in this embodiment is identical to that shown in FIG. 1 and is not repeated in FIG. 2, and elements shown in FIG. 2 with the same reference numbers as in FIG. 1 are basically the same as described in connection with FIG. 1.

Figure 2:
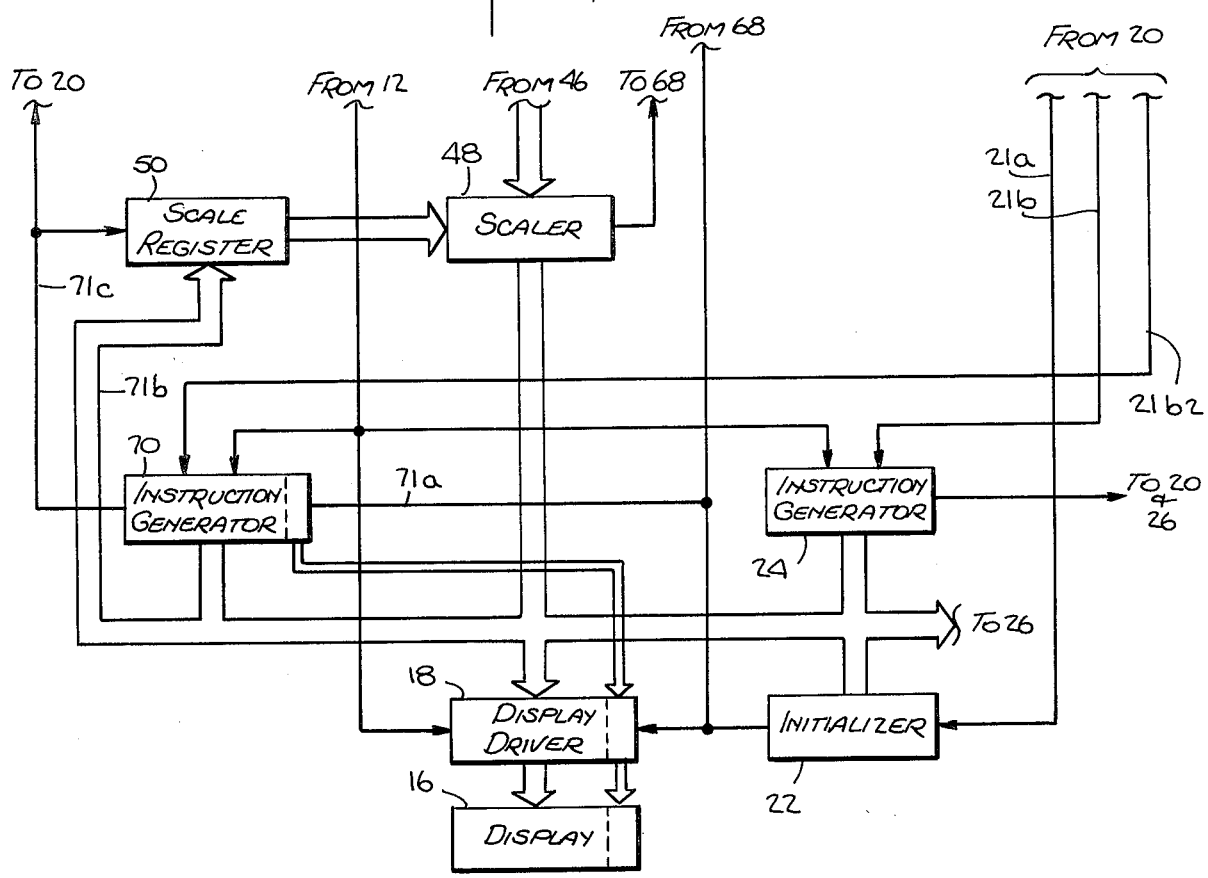
FIG. 2 is a schematic block diagram of a portion of another illustrative embodiment of the digital circuitry of a weighing scale constructed in accordance with the principles of the invention.

In the scale of FIG. 2, initializer 22 is first enabled by a signal on lead 21a and performs as described above. Thereafter, instruction generator 24 is enabled by a signal on lead 21b and also performs as described above to enable selection of the number of weight determinations to be averaged. After that has been done, sequence controller 20 (not shown in FIG. 2, but basically similar to sequence controller 20 in FIG. 1) enables instruction generator 70 via a signal applied to lead 21b2. When thus enabled, instruction generator 70 functions similarly to instruction generator 24 to produce a succession of messages applied to display driver 18 for display by display 16. These messages give the user the choice of several scale or conversion factors for storage in scale register 50. Any of several different types of scale factors may be the subject of these messages. For example, the user may be given the choice of several different weight units (e.g., grams, ounces, pennyweight, carats, grains, etc.) in which the weight on the scale is to be computed and displayed. Or the user may be given the choice of several different monetary values per unit weight for use by the scale in direct conversion from weight to monetary value. As yet another example, the user may be given a choice of several scale operating ranges (e.g., 300 grams, 30 grams, etc.).

Assuming for purposes of illustration that instruction generator 70 is designed to offer the choice of several different weight units, instruction generator 70 may cause messages such as "SEL g", "SEL o", "SEL d", "SEL c", "SEL G", etc., to be successively displayed by display 16 to prompt the user to select the desired one of grams, ounces, pennyweight, carats, grains, etc., respectively. Illustratively, the letters "SEL" in each message appear in the left-hand portion of display 16, while the units symbol portion of each message appears in the right-hand or units indicating portion of the display. The right-hand portion of display driver 18 is preferably arranged to store the most recently applied units signal produced by instruction generator 70 so that if that weight unit is selected, the symbol for that unit will appear on display 16 at appropriate times during subsequent weight displays. During operation of instruction generator 70, the right-hand portion of display driver 18 is enabled by a signal on lead 71a. During the display of each message generated by instruction generator 70, instruction generator 70 also generates a corresponding digital conversion factor which is applied to scale register 50 via leads 71b.

As in the case of instruction generator 24, when the message indicating the desired weight unit appears on display 16, the user selects that weight unit by operating tare switch 12. This extinguishes display 16 via display driver 18 and stops the cycling of instruction generator 70. Instruction generator 70 then produces an output signal on lead 71c which enables scale register 50 to store the scale factor appropriate to the selected weight unit. The signal on lead 71c is also applied to sequence controller 20 to cause that device to advance to its next condition in which instruction generator 70 is disabled via lead 21b2 and clock 28 is enabled via lead 21c as previously described in connection with FIG. 1. The scale then operates as described in connection with FIG. 1 except that scale register 50 contains a user-selected scale factor and the units indicating portion of display 16 shows a symbol representative of the selected unit of weight measurement (e.g., "g", "o", "d", "c", or "G") whenever the corresponding portion of display driver 18 is enabled by the output signal of switch 68.

Also as in the case of instruction generator 24, if the user does not make a selection in response to the messages generated by instruction generator 70, a predetermined unit of measurement (e.g., grams) is selected automatically when instruction generator 70 reaches the end of its operating cycle. Operation of the scale then continues as described above.

The embodiment shown in FIG. 2 allows the user to select both an averaging constant to be stored in K register 26 and a scale factor to be stored in register 50. If only the selection of a scale factor is of interest, instruction generator 24 and associated elements can be deleted. Similarly, any other computational parameter in the scale can be varied in the same general way described in detail above.

The computational parameter selected in accordance with this invention need not be a single constant number as in the illustrative embodiments described above. For example, if the scale is to be used to display a quantity which bears a nonlinear relationship to weight (as may be the case, for example, for such units of measurement as yarn count or tex count used in the textile industry), the options available for selection may include computational formulas which the scale is capable of performing or look-up tables which the scale is capable of accessing in computation of the weight-dependent value to be displayed. Thus the computational parameter selected may be one which substantially alters the computational algorithm of the scale, e.g., by requiring additional computational steps when certain options are selected. These changes in the computational algorithm may substantially alter the function of the scale, e.g., from normal scale operation to operation as a moisture measuring device in which the quantity or percent of moisture contained in a sample on the scale is indicated as the moisture is driven off the sample. An example of this type of change in the function of the scale occurs in the illustrative embodiment shown in FIG. 1 where the stability indicating function (elements 60, 62, 64, and 66) is automatically suspended when a number larger than 2 is selected for storage in K register 26. It will therefore be understood that the term "computational parameter" as used herein and in the appended claims includes both the numbers used in the computational algorithm of the scale and alternative portions of the computational algorithm itself.

Although specific scale circuitry has been shown in FIGS. 1 and 2 and described above, it will be understood that this invention is equally applicable to other digital scale circuitry. It will also be understood that the required scale circuitry can be implemented wholly or partly with a suitably programmed digital computer or microprocessor.

We claim:

1. In a scale having a digital display for producing a visual indication which is a function of the weight of an object placed on the scale, the scale including digital signal generating means for producing digital output signals proportional to the weight on the scale and digital computation means for computing the digital numbers to be displayed from the digital output signals of the digital signal generating means in accordance with a computational algorithm determined in part by at least one selected variable digital parameter, the improvement comprising:

first means for causing the digital display to automatically display a plurality of indications one at a time in succession, each indication being displayed by the digital display for a predetermined limited time interval and each indication being representative of a respective one of a plurality of alternative values for the variable digital parameter;

a single switch mounted on the exterior of the scale where the switch is immediately accessible to and operable by the person who ordinarily uses the scale to weigh objects, the switch having only a single operated position and being operable to the operated position by said person while said person is observing the digital display, the switch producing an output signal when operated by said person to the operated position concurrently with observation by said person of the display by the digital display of the indication representative of the alternative value desired by said person; and second means responsive to the first means and to the output signal of the switch for storing as the selected variable digital parameter the alternative value represented by the indication being displayed by the digital display concurrently with the occurrence of the output signal of the switch.

2. The apparatus defined in claim 1 wherein the computational algorithm includes averaging a selected number of successive weight determinations and wherein the selected variable digital parameter is the number of successive weight determinations to be averaged.

3. The apparatus defined in claim 1 wherein the computational algorithm includes a selected digital scale factor and wherein the selected variable digital parameter is the digital scale factor.

4. The apparatus defined in claim 3 wherein each value of the selected digital scale factor corresponds to a unit of measurement in which the weight of the object is to be displayed and wherein the second means includes third means for causing the digital display to produce a visual indication representative of the unit of measurement corresponding to the selected value of the digital scale factor during weighing operations of the scale.

5. The apparatus defined in claim 1 wherein the first means is also responsive to the output signal of the switch for terminating display of the alternative values when the output signal of the switch occurs.

6. The apparatus defined in claim 1 wherein the first means produces an output signal if all of the alternative values are displayed prior to occurrence of the output signal of the switch and wherein the second means is responsive to the output signal of the first means for storing a predetermined number as the selected variable digital parameter.

* * * * *